(12) United States Patent
Dhaens

(10) Patent No.: US 11,577,572 B2
(45) Date of Patent: Feb. 14, 2023

(54) METHODS AND SYSTEMS FOR USING WASTE ENERGY FROM ELECTRIC MOTORS AND INVERTERS IN ELECTRIC VEHICLE AIR SUSPENSION SYSTEMS

(71) Applicant: DRiV Automotive Inc., Southfield, MI (US)

(72) Inventor: Miguel Dhaens, Lommel (BE)

(73) Assignee: DRiV Automotive Inc., Southfield, MI (US)

( * ) Notice: Subject to any disclaimer, the term of this patent is extended or adjusted under 35 U.S.C. 154(b) by 45 days.

(21) Appl. No.: 17/358,382

(22) Filed: Jun. 25, 2021

(65) Prior Publication Data

US 2022/0410647 A1    Dec. 29, 2022

(51) Int. Cl.
*B60G 17/00* (2006.01)
*B60G 17/052* (2006.01)
(Continued)

(52) U.S. Cl.
CPC ......... *B60G 17/002* (2013.01); *B01D 53/261* (2013.01); *B01J 20/165* (2013.01);
(Continued)

(58) Field of Classification Search
CPC .... B60G 17/002; B60G 11/27; B60G 17/052; B60G 2202/152; B01D 53/261;
(Continued)

(56) References Cited

U.S. PATENT DOCUMENTS

| 3,183,014 A | * | 5/1965 | Doomernik | B60G 99/00 280/DIG. 1 |
| 9,784,330 B2 | | 10/2017 | Coakley et al. | |

(Continued)

FOREIGN PATENT DOCUMENTS

| CN | 103058186 B | 3/2015 |
| DE | 102015209107 A1 | 11/2016 |

(Continued)

OTHER PUBLICATIONS

Extended European Search Report regarding Application No. 22177593.5, dated Sep. 29, 2022.

*Primary Examiner* — Paul N Dickson
*Assistant Examiner* — Kurtis Nielson
(74) *Attorney, Agent, or Firm* — Harness, Dickey & Pierce, P.L.C.

(57) ABSTRACT

An air suspension system according to the principles of the present disclosure includes a suspension actuator, a reservoir, a compressor, and a first cooling circuit. The suspension actuator has a chamber. The reservoir includes a shell and an adsorptive material. The shell at least partially defines an interior region. The interior region is fluidly connected to the chamber. The adsorptive material is in the
(Continued)

interior region. The compressor is fluidly connected to the interior region. The first cooling circuit includes a first heat exchanger, a second heat exchanger, and a conduit. The first heat exchanger is in thermal contact with the interior region. The second heat exchanger is in thermal contact with an electric vehicle component. The conduit is adapted to circulate a fluid between the first heat exchanger and the second heat exchanger. The present disclosure also provides a method of operating the air suspension system.

20 Claims, 6 Drawing Sheets

(51) Int. Cl.
    B01D 53/26  (2006.01)
    B01J 20/16  (2006.01)
    B01J 20/20  (2006.01)
    B01J 20/28  (2006.01)
    B60G 11/27  (2006.01)
    F28D 7/10   (2006.01)
(52) U.S. Cl.
    CPC ......... *B01J 20/20* (2013.01); *B01J 20/28004* (2013.01); *B01J 20/28016* (2013.01); *B01J 20/28042* (2013.01); *B60G 11/27* (2013.01); *B60G 17/052* (2013.01); *F28D 7/10* (2013.01); *B60G 2202/152* (2013.01); *B60G 2400/7122* (2013.01); *B60G 2500/205* (2013.01); *B60G 2500/2014* (2013.01); *B60G 2600/66* (2013.01); *B60G 2800/162* (2013.01)

(58) Field of Classification Search
    CPC .... B01J 20/165; B01J 20/20; B01J 20/28004; B01J 20/28016; B01J 20/28042
    See application file for complete search history.

(56) References Cited

U.S. PATENT DOCUMENTS

| | | | |
|---|---|---|---|
| 10,343,478 B2 | 7/2019 | Coakley et al. | |
| 10,352,503 B2 | 7/2019 | Coakley et al. | |
| 10,533,621 B2 | 1/2020 | Coakley et al. | |
| 2015/0048577 A1* | 2/2015 | Frank | F16K 31/0658 280/5.514 |
| 2017/0132999 A1 | 5/2017 | Coakley et al. | |
| 2017/0259641 A1* | 9/2017 | Ohashi | B60G 17/0155 |
| 2019/0084365 A1* | 3/2019 | Oishi | B60G 17/052 |
| 2019/0170448 A1* | 6/2019 | Nam | B60H 1/32014 |
| 2020/0232485 A1 | 7/2020 | Coakley et al. | |
| 2020/0287255 A1* | 9/2020 | Herrmann | H01M 10/625 |
| 2022/0016567 A1* | 1/2022 | Mbadinga Mouanda | B01D 53/261 |

FOREIGN PATENT DOCUMENTS

| | | |
|---|---|---|
| EP | 3165270 A1 | 5/2017 |
| GB | 201914866 | 10/2019 |
| WO | WO-2012052776 A1 | 4/2012 |
| WO | WO-2015145148 A1 | 10/2015 |
| WO | WO-2015173545 A1 | 11/2015 |
| WO | WO-2015193671 A1 | 12/2015 |
| WO | WO-2017076979 A1 | 5/2017 |
| WO | WO-2020008072 A1 | 1/2020 |

* cited by examiner

METHODS AND SYSTEMS FOR USING WASTE ENERGY FROM ELECTRIC MOTORS AND INVERTERS IN ELECTRIC VEHICLE AIR SUSPENSION SYSTEMS

FIELD

The present disclosure relates to methods and systems for using waste energy from electric motors and inverters in electric vehicle air suspension systems.

BACKGROUND

This section provides background information related to the present disclosure which is not necessarily prior art.

Devices for raising and lowering a vehicle, such as to increase or decrease ground clearance, often include a pneumatic suspension actuator movable between a raised position, a lowered position, and a plurality of intermediate positions. The pneumatic suspension actuator may have a chamber that receives air from a compressor to facilitate movement between positions.

SUMMARY

This section provides a general summary of the disclosure, and is not a comprehensive disclosure of its full scope or all of its features.

The present disclosure provides an air suspension system for a vehicle. The air suspension system includes a suspension actuator, a reservoir, a compressor, and a first cooling circuit. The suspension actuator has a chamber. The reservoir includes a shell and an adsorptive material. The shell at least partially defines an interior region. The interior region is fluidly connected to the chamber. The adsorptive material is in the interior region. The compressor is fluidly connected to the interior region. The first cooling circuit includes a first heat exchanger, a second heat exchanger, and a conduit. The first heat exchanger is in thermal contact with the interior region. The second heat exchanger is in thermal contact with an electric vehicle component. The conduit is adapted to circulate a fluid between the first heat exchanger and the second heat exchanger.

In some configurations, the adsorptive material includes activated carbon, a silicate, a zeolite, or any combination thereof.

In some configurations, the adsorptive material is in a form of a monolith.

In some configurations, the adsorptive material is in a form of a plurality of particles.

In some configurations, the plurality of particles define an average size ranging from 0.3 mm to 0.9 mm.

In some configurations, the suspension actuator includes an air spring, an air bellow, or both an air spring and an air bellow.

In some configurations, the first cooling circuit further includes a bypass valve on the conduit. The bypass valve is adapted to move between a first position in which the fluid is circulated through the first heat exchanger and a second position in which the fluid bypasses the first heat exchanger.

In some configurations, the first cooling circuit further includes a thermostat valve.

In some configuration, the air suspension system of further includes a valve between the reservoir and the suspension actuator.

In some configurations, the air suspension system further includes a second cooling circuit. The second cooling circuit includes the second heat exchanger, a second conduit, and the electric vehicle component. The fluid is a first fluid. The second conduit is adapted to circulate a second fluid between the electric vehicle component and the second heat exchanger.

In some configurations, the electric vehicle component includes an electric motor, an inverter, a DC charger, an electrochemical device, or any combination thereof.

In some configurations, the first heat exchanger includes a shell and tube heat exchanger.

The present disclosure provides method operating an electric vehicle air suspension system. The method includes providing air to a reservoir including an absorptive material. The method further includes heating a fluid by operating an electric vehicle component. The method further includes heating the adsorptive material by circulating the fluid through a heat exchanger in thermal contact with the reservoir. Circulating the fluid increases a pressure in the reservoir. The method further includes providing the air to a suspension element including a chamber.

In some configurations, providing the air to the reservoir is performed by a compressor-dryer.

In some configurations, the absorptive material includes activated carbon, a silicate, a zeolite, or any combination thereof.

In some configurations, the method further includes regulating flow of the fluid with a thermostat valve.

In some configurations, regulating includes, directing the fluid to the heat exchanger when a temperature of the fluid is greater than or equal to a predetermined temperature. Regulating further includes directing the fluid to a bypass line when the temperature of the fluid is less than the predetermined temperature.

In some configurations, heating the fluid includes operating an electric motor, an inverter, a DC charger, an electrochemical device, or any combination thereof.

In some configurations, the suspension actuator includes an air spring, an air bellow, or both an air spring and an air bellow.

In some configurations, heating the adsorptive material includes circulating the fluid through tubes of a shell and tube heat exchanger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
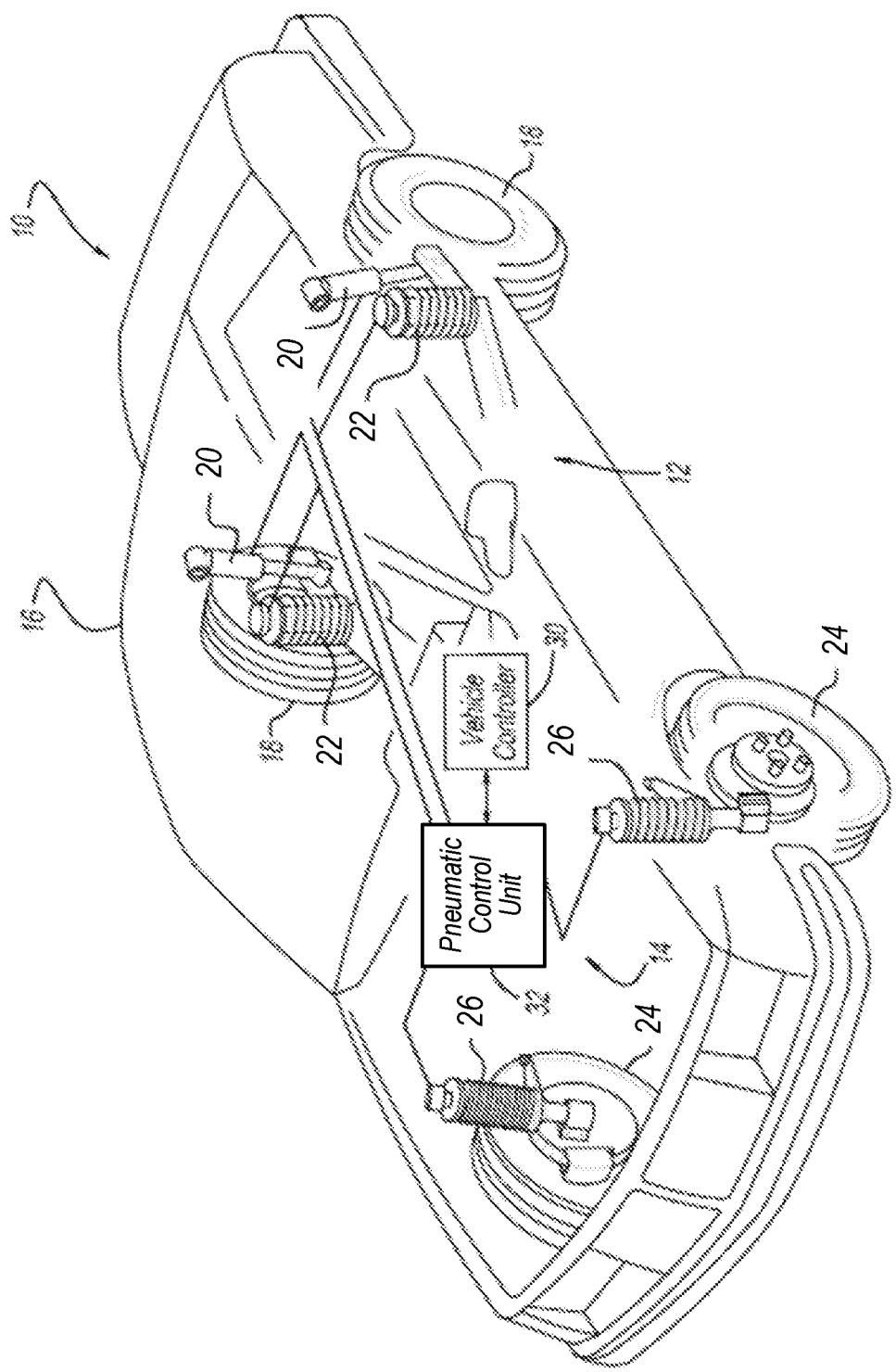
FIG. 1 illustrates an exemplary electric vehicle including an air suspension system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a vehicle 10 including a vehicle air suspension leveling system according to the present teachings is provided. The vehicle 10 generally includes a rear suspension 12, a front suspension 14, and a body 16. The rear suspension 12 has a rear axle assembly (not shown) adapted to operatively support the vehicle's rear wheels 18. The rear axle assembly is operatively connected to the body 16 by first suspension actuators 20 and second suspension actuators 22. The front suspension 14 similarly includes a transversely extending front axle assembly (not shown) to operatively support front wheels 24 of the vehicle 10. The front axle assembly is operatively connected to body 16 by third suspension assemblies 26. The first and the third suspension actuators 20 and 26 serve to damp relative motion of an unsprung portion (i.e., front and rear suspensions 12 and 14, respectively) and a sprung portion (i.e., body 16) of vehicle 10.

Although the vehicle 10 is illustrated as a passenger car having front and rear axle assemblies, the suspension actuators 20, 22, 26 may be used with other types of vehicles and/or in other types of applications, such as vehicles incorporating independent front and/or independent rear suspension systems. Furthermore, although the vehicle 10 is illustrated as including a pair of each one of the suspension actuators 20, 22, 26, the vehicle 10 can include any suitable combination of the suspension actuators 20, 22, and/or 26. For example, the first and second suspension actuators 20, 22 as illustrated can be replaced with a single suspension actuator. Each of the suspension actuators 20, 22, 26 may include a chamber for receiving air. The suspension actuators 20, 22, 26 may include air struts, air springs (e.g., axial air springs, multi-chamber air springs), air bellows, air bags, or any combination thereof.

The suspension assemblies 20, 22, 26 are included with a suspension leveling system and are adapted to raise and lower the vehicle 10. The vehicle 10 further includes a vehicle controller 30 adapted to control operation of the suspension assemblies 20, 22, 26 with respect to raising and lowering of the vehicle 10. Specifically, the vehicle controller 30 is adapted to send commands to a pneumatic control unit 32 for raising and lowering the vehicle 10. The vehicle controller 30 can be any suitable controller, such as a microcontroller or microprocessor.

Figure 2:
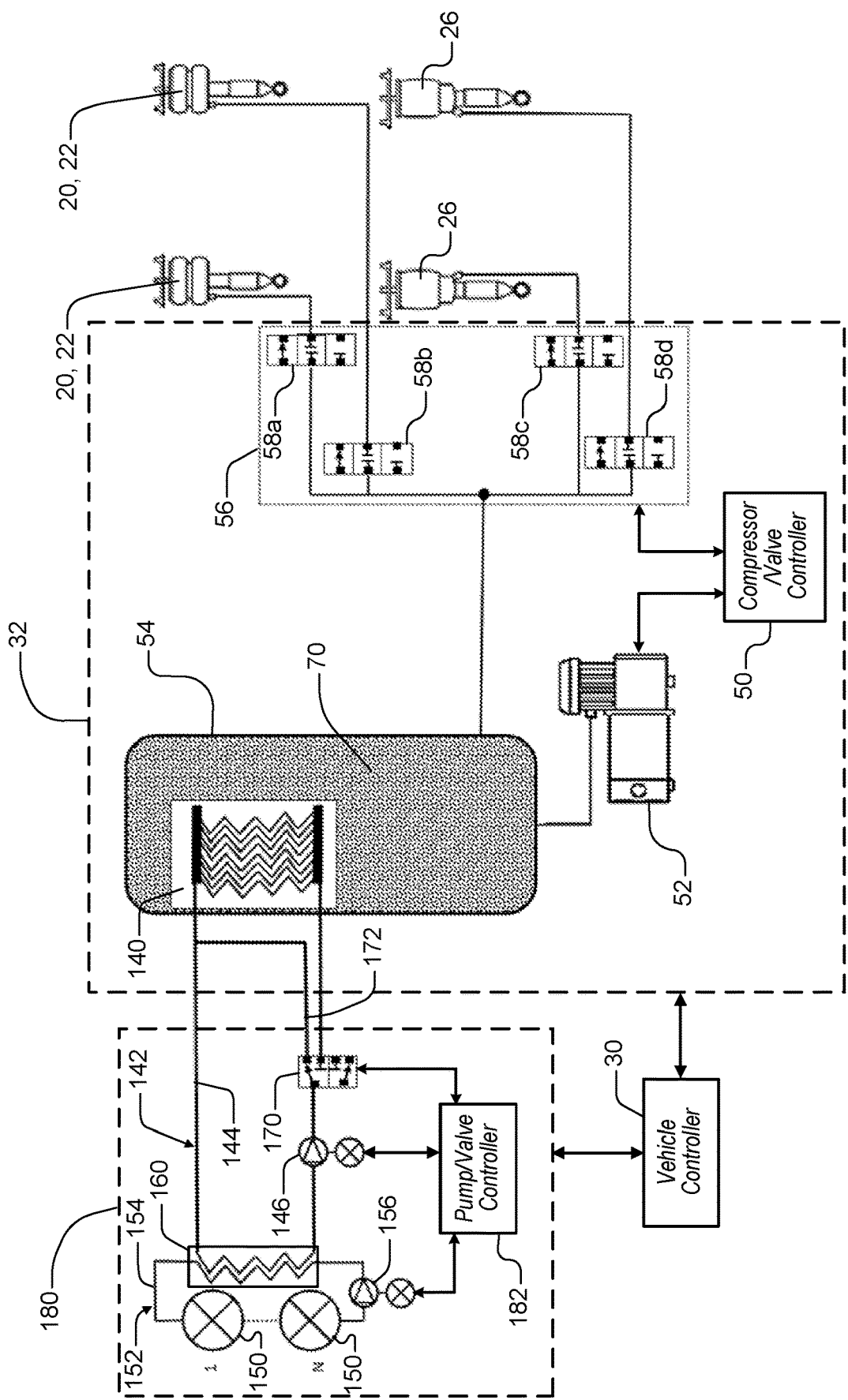
FIG. 2 is a schematic illustration of the air suspension system of FIG. 1 according to the principles of the present disclosure.

Referring to FIG. 2, the pneumatic control unit 32 generally includes a compressor/valve controller 50, a compressor-dryer 52, a reservoir 54, and a valve block 56. The compressor/valve controller 50 may be any suitable controller. The valve block 56 may include first and second valves 58a, 58b operatively connected to the first and second suspension actuators 20, 22 and third and fourth valves 58c, 58d operatively connected to the third suspension actuators 26. The valves 58a, 58b, 58c, 58d may be any suitable valves, such as two-port, three-way control valves as illustrated. The compressor/valve controller 34 is adapted to actuate any one of the valves 58a, 58b, 58c, 58d individually or in combination as appropriate to raise or lower any one or more of the suspension actuators 20, 22, 26 and thus raise or lower one or more corners of the vehicle 10.

The compressor-dryer 52 may be fluidly connected to the reservoir 54 (i.e., an interior region of the reservoir 54). The compressor-dryer 52 may be upstream of the reservoir 54. Accordingly, the compressor-dryer 52 may be adapted to provide air to the interior region of the reservoir 54.

The reservoir 54 may be fluidly connected to the valve block 56. The reservoir 54 may be upstream of the valve block 56. Accordingly, the reservoir may be adapted to provide air to the valve block 56.

The reservoir 54 may include an adsorptive material 70. The adsorptive material 70 may be disposed in the interior region of the reservoir 54, as will be described in greater detail below. The adsorptive material 70 may be adapted to increase an uptake of air in the reservoir 54 compared to a reservoir without an adsorptive material 70.

The term "adsorptive material" is interchangeable with "adsorbent," adsorbent material," "porous solid," and any other equivalent term referring to materials that exhibit processes of adsorption and desorption via high microporosity and corresponding high surface area. The adsorptive material is capable of adsorbing large amounts of air and/or other gas in a limited volume, such as the interior of the reservoir 54. Because the adsorptive material 70 has a high surface area, it can adsorb a large amount of air and/or other gas by forming a film on its solid surface. The adsorbent material is capable of adsorbing more gas molecules than would normally occupy the same volume at a given pressure, because the gas molecules "stick" (adsorb) to the surface of the adsorptive material 70 through van der Waals forces.

The ability of the adsorptive material 70 to retain large volumes of air and/or other gas is a function of its temperature. More specifically, the adsorptive material 70 is capable of retaining more air and/or gas at lower temperatures than higher temperatures. As a temperature of the adsorptive material 70 increases, air and/or gas uptake of the adsorptive material 70 decreases and pressure in the reservoir increases as a result of the air and/or gas released from the adsorptive material. Accordingly, a temperature of the adsorptive material 70 may be manipulated to effect pressure adjustments within the reservoir 54.

The adsorptive material 70 may include activated carbon, a silicate, a zeolite, or any combination thereof. The term activated carbon relates to the family of carbonaceous materials specifically activated to develop strong adsorptive properties whereby trace quantities of liquid and gases may be absorbed into carbon. Such activated carbons may be produced from a wide range of sources, such as coals, wood, nuts (e.g., coconut), and bones and may be derived from synthetic sources such as polyacrylonitrile or the like. Various methods of activation exist, such as selective oxidation with steam, carbon dioxide, or other gases at elevated temperatures or chemical activation using, for example zinc chloride or phosphoric acid. An example of activated carbon is CELLCARB™, which is commercially available from Chemviron Carbon Limited, 434 London Road, West Thurrock, Grays Essex RM20 4DH, UK.

Figure 3:
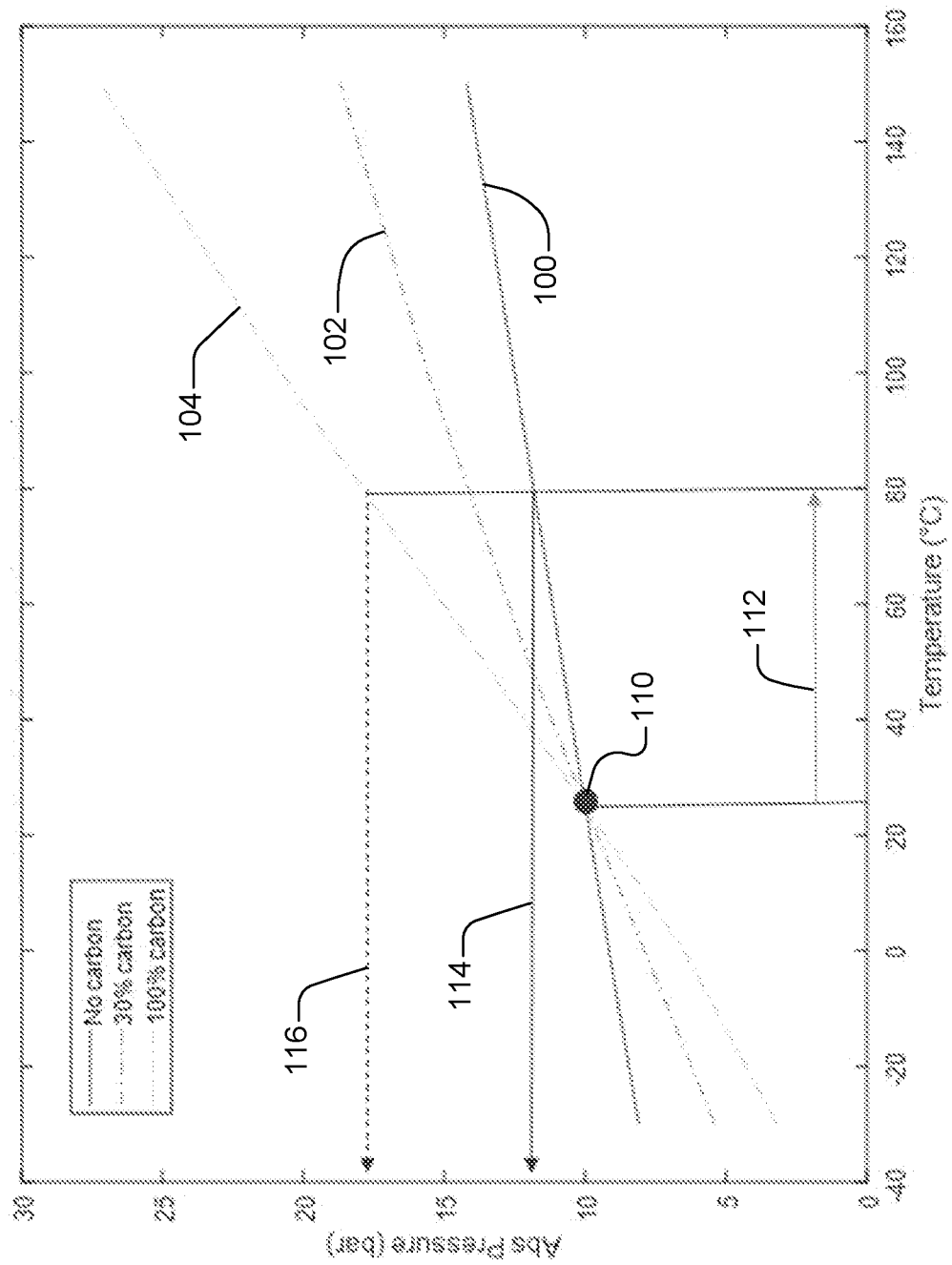
FIG. 3 is a graph depicting pressure as a function of temperature within a reservoir according to the principles of the present disclosure.

Referring to FIG. 3, a graph depicting pressure as a function of temperature within a 0.5 L reservoir according to the principles of the present disclosure is provided. The x-axis represents temperature in ° C. The y-axis represents absolute pressure in bar. A first curve 100 represents behavior in a first reservoir that is free of an adsorptive material. A second curve 102 represents behavior in a second reservoir that is partially filled with porous activated carbon (i.e., about 30% filled with the porous activated carbon). A third curve 104 represents behavior in a third reservoir that is filled with porous activated carbon (i.e., about 100% filled with the porous activated carbon).

Each of the reservoirs has an initial set point 110 of 25° C. and 10 bar. As temperature of each of the reservoirs is increased, the pressure also increases. For example, as the temperature is raised from 25° C. to 80°, as shown at 112, a pressure of the first reservoir (free of adsorptive material) increases to about 12 bar, as shown at 114. The pressure increase is greater for the reservoirs containing activated carbon. For example, a pressure of the third reservoir increases to about 18 bar over the same temperature change, as shown at 116. As temperature is increased, a difference between the curves 100, 102, 104 parallel to the y- or pressure axis increases.

Figure 5:
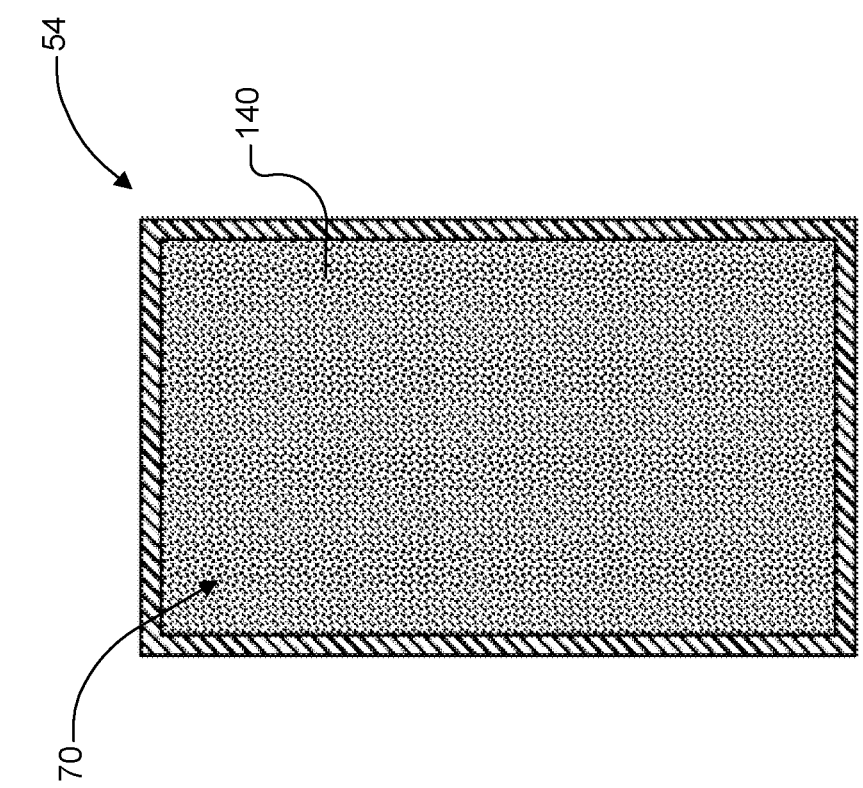
FIG. 5 is a sectional view of the reservoir of the air suspension system of FIG. 2 including a monolithic adsorptive material according to the principles of the present disclosure.
Figure 4:
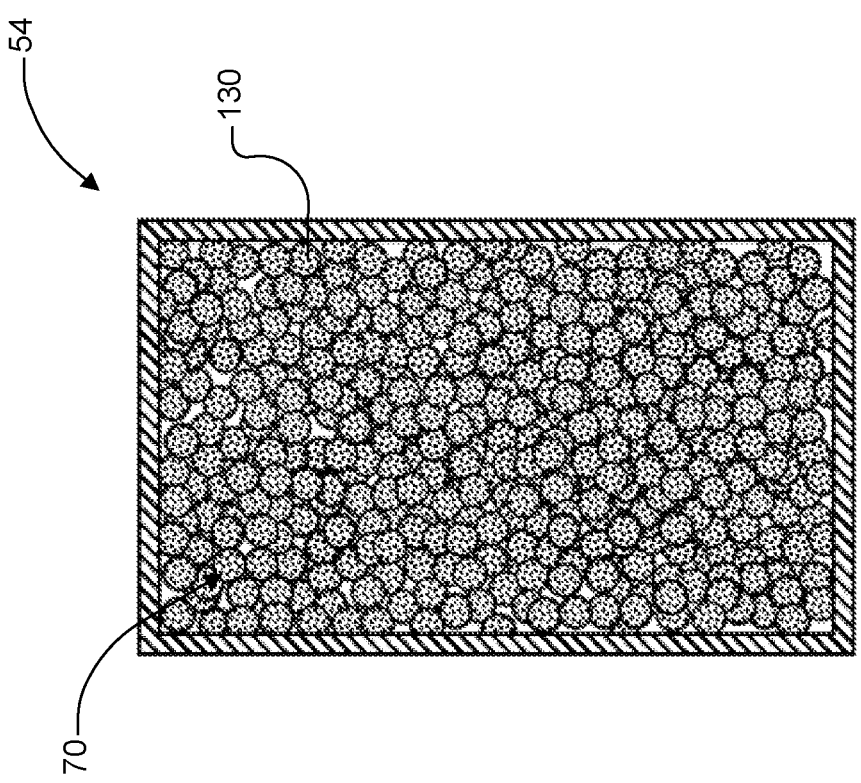
FIG. 4 is a sectional view of a reservoir of the air suspension system of FIG. 2 including a granular adsorptive material according to the principles of the present disclosure.

The adsorptive material may be monolithic, granular, or any other suitable form. With reference to FIG. 4, the adsorptive material 70 in the reservoir 54 may be in a form of a plurality of particles 130. The particles 130 may be porous. The particles 130 may define an average particle size (i.e., diameter) of greater than or equal to about 0.1 mm (e.g., greater than or equal to about 0.2 mm, greater than or equal to about 0.3 mm, greater than or equal to about 0.4 mm, greater than or equal to about 0.5 mm, greater than or equal to about 0.6 mm, greater than or equal to about 0.7 mm, greater than or equal to about 0.8 mm, or greater than or equal to about 0.9 mm). The average particle size may be less than or equal to about 1 mm (e.g., less than or equal to about 0.9 mm, less than or equal to about 0.8 mm, less than or equal to about 0.7 mm, less than or equal to about 0.6 mm, less than or equal to about 0.5 mm, less than or equal to about 0.4 mm, less than or equal to about 0.3 mm, or less than or equal to about 0.2 mm). In some examples, the average particle size ranges from 0.3 mm to 0.9 mm. Referring to FIG. 5, the adsorptive material 70 in the reservoir 54 may be provided in a form of a porous monolith 140.

A volume of the reservoir may contain greater than or equal to about 10% of the adsorptive material (e.g., greater than or equal to about 20%, greater than or equal to about 30%, greater than or equal to about 40%, greater than or equal to about 50%, greater than or equal to about 60%, greater than or equal to about 70%, greater than or equal to about 80%, greater than or equal to about 90%, or greater than or equal to about 95%). In some examples, the reservoir is substantially full of porous adsorptive material.

Returning to FIG. 2, the interior region reservoir 54, including the adsorptive material 70, may be in thermal contact with a first heat exchanger 140. The first heat exchanger 140 may be adapted to modify, such as increase, a temperature of the adsorptive material 70. Accordingly, operation of the first heat exchanger 140 may facilitate a change in pressure in the reservoir 54, as will be described in greater detail below.

The first heat exchanger 140 may be part of a first cooling circuit 142. The first cooling circuit 142 may be adapted to circulate a fluid or coolant, such as water, through a first conduit 144 via operation of a first pump 146. The cooling fluid may be heated and the delivered to the first heat exchanger 140 to raise a temperature of the adsorptive material 70 in the reservoir 54.

The vehicle 10 further includes one or more electric vehicle components 150. The electric vehicle components 150 may generate heat during operation. The electric vehicle components 150 may include electric motors, as shown. Additionally or alternatively, the electric vehicle components may include inverter(s), DC charger(s), electrochemical device(s), and/or other heat-generating components. Electric motors, inverters, and DC chargers generally have an efficiency around 91%. Electrochemical devices, such as batteries, generally have an efficiency of around 93% when transforming chemical to electrical energy and from electric to chemical energy.

The electric vehicle components 150 may be part of and/or in thermal communication with a second cooling circuit 152. The second cooling circuit 152 may be adapted to circulate a coolant or fluid, such as water, through a second conduit 154 via operation of a second pump 156. Circulation of the coolant or fluid may facilitate cooling of the electric vehicle components 150 via transfer or heat from the electric vehicle components 150 to the cooling fluid and away from the electric vehicle components 150 via the second conduit 154.

The second pump 156 may circulate the fluid through a second heat exchanger 160. The second heat exchanger 160 may be in thermal contact with the first cooling circuit 142 to facilitate transfer of heat from the second cooling circuit 152 to the first cooling circuit 142. Accordingly, waste heat generated during operation of the electric vehicle components 150 may be used to heat the adsorptive material 70.

The first cooling circuit 142 may further include a bypass valve 170 and a bypass line 172. The bypass valve 170 may be a three-port, two-way valve, as shown. The bypass valve 170 may be adapted to move between a first position in which cooling fluid is directed to the first heat exchanger 140 and a second position in which cooling fluid is directed to the bypass line 172.

In some examples, the bypass valve 170 may be a thermostat valve. The thermostat valve may be adapted to direct fluid to the first heat exchanger 140 when a temperature of the cooling fluid in the first conduit 144 is greater than or equal to a predetermined or threshold temperature. The thermostat valve may be adapted to direct fluid to the bypass line 172 when the temperature of the cooling fluid in the first conduit 144 is less than the predetermined temperature. The thermostat valve may be electrically or mechanically operated. The first and second cooling circuits 142, 152 may further include temperature and/or pressure sensors (not shown). In other examples, the first cooling circuit 142 includes separate thermostat and bypass valves.

The first and second cooling circuits 142, 152 may be part of hydraulic control unit 180. The hydraulic control unit 180 may include a pump/valve controller 182. The pump/valve controller 182 may be in operative communication with the first and second pumps 146, 156 and the bypass valve 170.

In some examples, hydraulic control unit 180 may include additional cooling circuits, conduits, pumps, and/or valves. For example, the hydraulic control unit 180 may include equipment and control for sending cooling fluid to different or additional vehicle systems, such as a cabin heating system and/or an electrochemical device condition system. In some examples, the waste heat is used to heat different systems during different time periods, such as alternatively transferring the heat to the reservoir 54 (via first and second heat exchangers 140, 160 and first and second cooling circuits 142, 152) or one or more other systems. For example, the waste heat may be used to heat the vehicle cabin and/or other components when the vehicle is started, and then to heat the reservoir 54 when the cabin and/or other components reach a predetermined or desired temperature. In other examples, waste heat is used to concurrently heat multiple systems. The pump/valve controller 180 may be adapted to control an amount or percentage of waste heat used to heat various vehicle systems.

In accordance with the principles of the present disclosure, a reservoir assembly may include both a reservoir and heat exchanger, such as a shell and tube heat exchanger or a jacketed vessel. The shell and tube heat exchanger or the jacketed vessel may be used as the reservoir 54 and first heat exchanger 140 of FIG. 2. A reservoir assembly may include different or additional components to facilitate heat exchange, such as fins.

Figure 6:
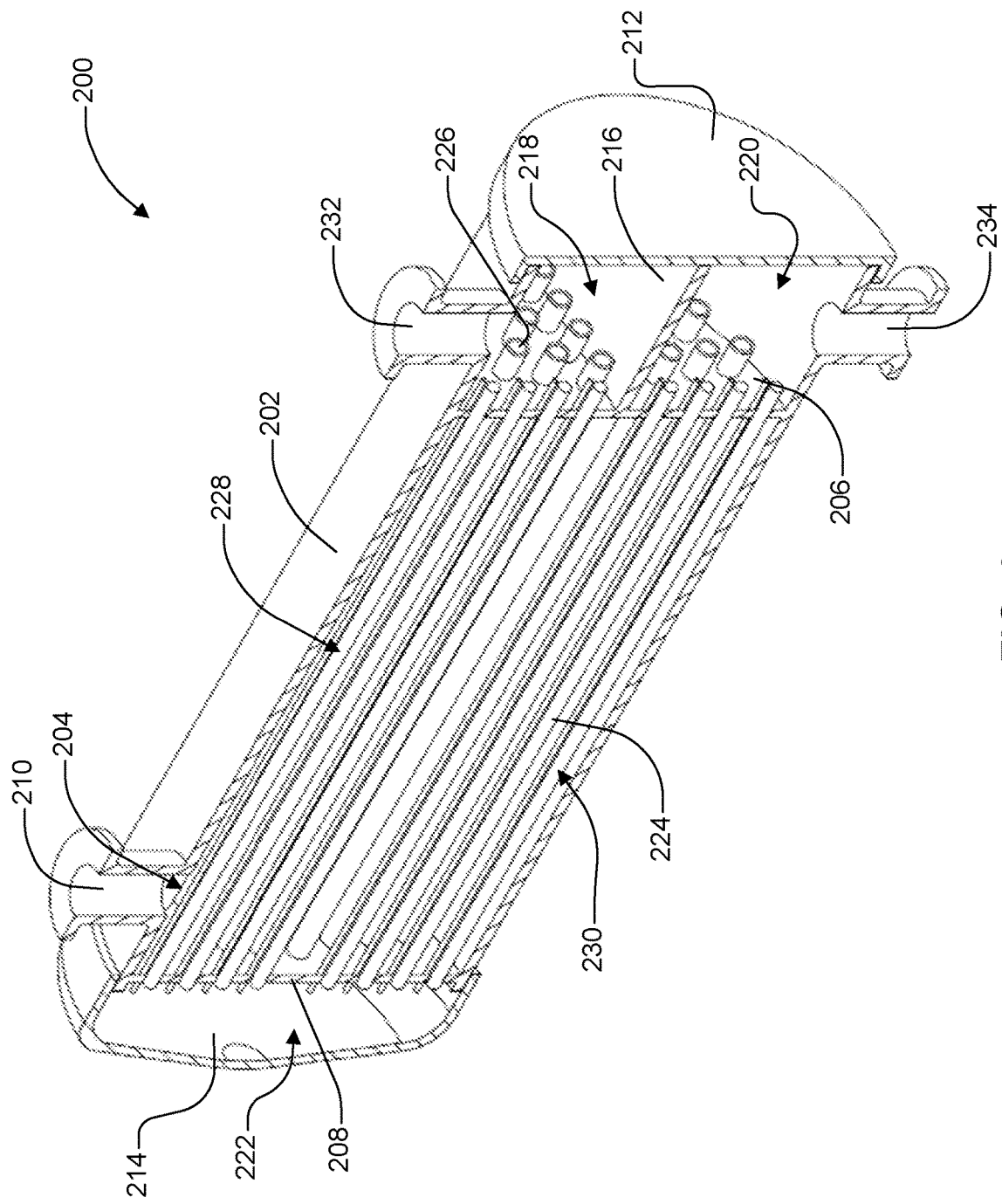
FIG. 6 is perspective sectional view of a shell and tube heat exchanger according to the principles of the present disclosure.

With reference to FIG. 6, a reservoir assembly or shell and tube heat exchanger 200 may include a shell 202. The shell 202 may at least partially define an interior region 204. The heat exchanger 200 may further include a first and second intermediate plates 206, 208. The intermediate plates 206, 208 may cooperate with the shell 202 to define the interior region 204. The interior region may contain an adsorptive material (not shown), such as the absorptive material 70 of FIGS. 2, 4, and/or 5.

The interior region 204 may be in fluid communication with a passage 210. The passage 210 may be an inlet and/or outlet, such as for air. In other examples, the interior region 204 may be in fluid communication with another air passage, such as when the reservoir assembly 200 includes a separate air inlet and outlet.

The heat exchanger 200 may further include first and second end caps 212, 214. The heat exchanger 200 may further include a transverse plate 216 extending between the first intermediate plate 206 and the second intermediate plate 208. The first end cap 212, the first intermediate plate 206, and the transverse plate 216 may cooperate to at least partially define an inlet coolant chamber 218 and an outlet coolant chamber 220. The transverse plate 216 extends between the coolant inlet chamber 218 and the coolant outlet chamber 220. The second end cap 214 may cooperate with the second intermediate plate 208 to at least partially define an intermediate coolant chamber 222. The inlet, outlet, and intermediate coolant chambers 218, 220, 222 may be fluidly isolated from the interior region 204.

The heat exchanger 200 may further include a plurality of tubes 224. Each tube defines a coolant passage 226. A first portion 228 of the plurality of tubes 224 extends between and fluidly connects the inlet coolant chamber 218 and the intermediate coolant chamber 222. A second portion 230 of the plurality of tubes 224 extends between and fluidly connects the intermediate coolant chamber 222 and the outlet coolant chamber 220.

The heat exchanger 200 may further include an inlet coolant passage 232 in fluid communication with the inlet coolant chamber 218 and an outlet coolant passage 236 in fluid communication with the outlet coolant chamber 220. During operation, the heat exchanger 200 may receive a heated cooling fluid via the inlet coolant passage 232 and discharge a cooled cooling fluid via the outlet coolant passage 234. The cooling fluid may flow from the inlet cooling passage 232, to the inlet coolant chamber 218, through the first portion 228 of tubes 224, into the intermediate coolant chamber 222, through the second portion 230 of the tubes 224, and out the outlet coolant passage 234.

Figure 7:
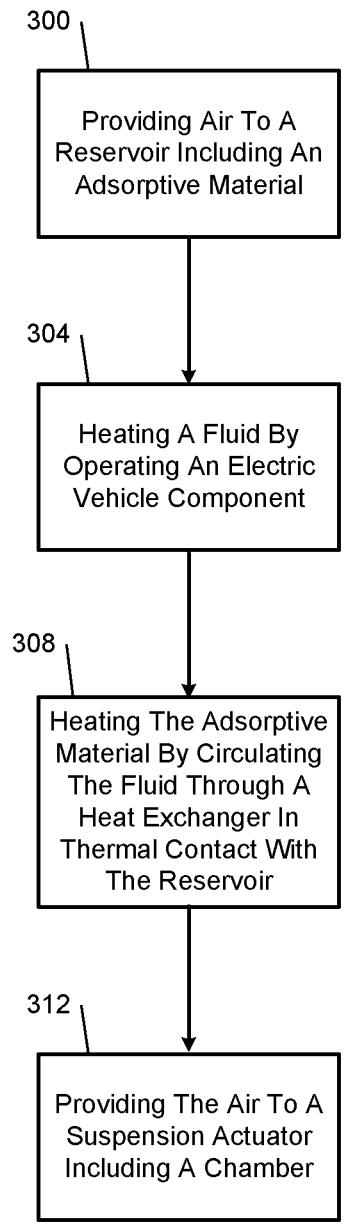
FIG. 7 is a flowchart depicting a method of operating the air suspension system of FIG. 1.

With reference to FIG. 7, a flowchart depicting a method of operating the air suspension system of FIGS. 1-6 according to the principles of the present disclosure is provided. At 300, the method includes providing air to the reservoir 54 including the adsorptive material 70. Providing air to the reservoir may be performed by the compressor-dryer 52. In some examples, the compressor-dryer 52 may provide air to the reservoir 54 until a predetermined reservoir pressure is reached. The compressor-dryer 52 may provide air within a predetermined temperature and moisture range. For example, the compressor-dryer 52 may provide relatively cool (e.g., around 25° C.), dry air to the reservoir 54.

At 304, the method includes heating a fluid, such as water, by operating the electric vehicle component 150. Operating of the electric vehicle component 150 may generate heat. The fluid may be heated by operating of the second cooling circuit 152. More specifically, the fluid may be heated by circulating the fluid in thermal contact with the electric vehicle component 150, such as through a second heat exchanger 160 and the second conduit 154 via operation of the second pump 156. The fluid may be heated concurrently with, prior to, or after providing the air at 300.

At 308, the method includes heating the adsorptive material 70 by circulating the fluid through the first heat exchanger 140, which is in thermal contact with the reservoir 54. Circulating the fluid may include operating the first pump 146 to circulate the fluid through the first conduit 144 and the first heat exchanger 140. The fluid may be circulated through tubes of a shell and tube heat exchanger (see, e.g., tubes 124 of FIG. 6), a jacket surrounding at least a portion of a surface of the reservoir 54, and/or any other suitable heat transfer features.

Heating the adsorptive material 70 causes the air update/retention of the adsorptive material to decrease. As a result, air is released from the adsorptive material 70. The released air causes an increase in pressure in the reservoir 54 (i.e., a generation of pressurized air).

The method may further include regulating flow of the fluid with the bypass valve 170. For example, the method may include operating the bypass valve 170 to be in a first position when a temperature of the fluid is greater than or equal to a predetermined or threshold temperature or a second position when the temperature is less than the predetermined or threshold temperature. In the first position, the bypass valve 170 directs the fluid to the first heat exchanger 140. In the second position, the bypass valve 170 directs the fluid to the bypass line 172.

At 312, the method includes providing the pressurized air to one or more of the suspension actuators 20, 22, 26. The air is discharged from the reservoir to the valve block 56 for selective transfer to the suspension actuators 20, 22, 26. In some examples, the pressurized air is supplemented or replaced by air from the compressor-dryer 52.

The method may further include raising and or lowering the vehicle. For example, the vehicle controller 30 may transmit a raise command to the pneumatic control unit 32, and specifically to the compressor/valve controller 34 thereof. Upon receipt of the "raise" command, the compressor/valve controller 34 operates one or more of the valves 58a, 58b, 58c, 58d, and/or the compressor dryer 52 to supply pressurized air to one or more of the suspension actuators 20, 22, 26. Receipt of the pressurized air raises the vehicle 10. The vehicle controller 30 may transmit a lower command to the pneumatic control unit 32, and specifically to the compressor/valve controller 34 thereof. Upon receipt of the "lower" command, the compressor/valve controller releases air from one or more suspension actuators 20, 22, 26 and closes one or more valves 58a, 58b, 58c, 58d, as appropriate. Withdrawal of the air from the suspension actuators lowers the vehicle 10.

A method of operating the electric vehicle air suspension system according to the principles of the present disclosure may include different or additional steps. In some examples, the method may further include monitoring temperatures and/or pressures at one or more points in the system. The method may further include adjusting valve positions, flow rates, and/or operational states in response to the temperature and/or pressure readings. In some examples, the method may further include diverting all or a portion of the fluid in the first cooling circuit 142 and/or the second cooling circuit 152 to other vehicle systems, as described above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air suspension system for a vehicle comprising:
a suspension actuator having a chamber;
a reservoir including,
a shell at least partially defining an interior region, the interior region fluidly connected to the chamber, and
an adsorptive material in the interior region;
a compressor fluidly connected to the interior region; and
a first cooling circuit including,
a first heat exchanger in thermal contact with the interior region,
a second heat exchanger in thermal contact with an electric vehicle component, and
a conduit adapted to circulate a fluid between the first heat exchanger and the second heat exchanger.

2. The air suspension system of claim 1, wherein the adsorptive material includes activated carbon, a silicate, a zeolite, or any combination thereof.

3. The air suspension system of claim 1, wherein the adsorptive material is in a form of a monolith.

4. The air suspension system of claim 1, wherein the adsorptive material is in a form of a plurality of particles.

5. The air suspension system of claim 4, wherein the plurality of particles define an average size ranging from 0.3 mm to 0.9 mm.

6. The air suspension system of claim 1, wherein the suspension actuator includes an air spring, an air bellow, or both an air spring and an air bellow.

7. The air suspension system of claim 1, wherein the first cooling circuit further includes a bypass valve on the conduit, the bypass valve adapted to move between a first position in which the fluid is circulated through the first heat exchanger and a second position in which the fluid bypasses the first heat exchanger.

8. The air suspension system of claim 1, wherein the first cooling circuit further includes a thermostat valve.

9. The air suspension system of claim 1, further comprising:
a valve between the reservoir and the suspension actuator.

10. The air suspension system of claim 9, wherein the electric vehicle component includes an electric motor, an inverter, a DC charger, an electrochemical device, or any combination thereof.

11. The air suspension system of claim 1, further comprising:
a second cooling circuit including,
the second heat exchanger
a second conduit, and
the electric vehicle component, wherein the fluid is a first fluid and the second conduit is adapted to circulate a second fluid between the electric vehicle component and the second heat exchanger.

12. The air suspension system of claim 1, wherein the first heat exchanger includes a shell and tube heat exchanger.

13. A method of operating an electric vehicle air suspension system comprising:
providing air to a reservoir including an absorptive material;
heating a fluid by operating an electric vehicle component;
heating the adsorptive material by circulating the fluid through a heat exchanger in thermal contact with the reservoir, thereby increasing a pressure in the reservoir; and
providing the air to a suspension element including a chamber.

14. The method of claim 13, wherein providing the air to the reservoir is performed by a compressor-dryer.

15. The method of claim 13, wherein the absorptive material includes activated carbon, a silicate, a zeolite, or any combination thereof.

16. The method of claim 13, further comprising:
regulating flow of the fluid with a thermostat valve.

17. The method of claim 16, wherein regulating includes,
directing the fluid to the heat exchanger when a temperature of the fluid is greater than or equal to a predetermined temperature, and
directing the fluid to a bypass line when the temperature of the fluid is less than the predetermined temperature.

18. The method of claim 17, wherein heating the fluid includes operating an electric motor, an inverter, a DC charger, an electrochemical device, or any combination thereof.

19. The method of claim 13, wherein the suspension element includes an air spring, an air bellow, or both an air spring and an air bellow.

20. The method of claim 13, wherein heating the adsorptive material includes circulating the fluid through tubes of a shell and tube heat exchanger.

* * * * *